(12) United States Patent
Hwang et al.

(10) Patent No.: US 9,087,397 B2
(45) Date of Patent: Jul. 21, 2015

(54) METHOD AND APPARATUS FOR GENERATING AN IMAGE OF AN ORGAN

(75) Inventors: Young-kyoo Hwang, Seoul (KR);
 Jung-bae Kim, Hwaseong-si (KR);
 Yong-sun Kim, Yongin-si (KR);
 Won-chul Bang, Seongnam-si (KR);
 Do-kyoon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 13/550,735

(22) Filed: Jul. 17, 2012

(65) Prior Publication Data

US 2013/0057547 A1 Mar. 7, 2013

(30) Foreign Application Priority Data

Sep. 5, 2011 (KR) .................. 10-2011-0089388

(51) Int. Cl.
 *G06T 17/00* (2006.01)
 *G06T 19/00* (2011.01)
 *G06T 7/00* (2006.01)

(52) U.S. Cl.
 CPC ............... *G06T 17/00* (2013.01); *G06T 7/0046* (2013.01); *G06T 19/00* (2013.01); *G06T 2207/10072* (2013.01); *G06T 2207/10116* (2013.01); *G06T 2207/10132* (2013.01); *G06T 2207/20056* (2013.01); *G06T 2207/20096* (2013.01); *G06T 2207/30056* (2013.01); *G06T 2207/30096* (2013.01); *G06T 2210/41* (2013.01)

(58) Field of Classification Search
 USPC .............. 600/425; 382/154, 128, 199; 607/17
 See application file for complete search history.

(56) References Cited

U.S. PATENT DOCUMENTS

| 7,120,290 | B2 * | 10/2006 | Parker et al. ................. | 382/154 |
| 7,558,402 | B2 | 7/2009 | Zhou et al. | |
| 7,713,205 | B2 | 5/2010 | Fu et al. | |
| 2005/0096543 | A1 * | 5/2005 | Jackson et al. ............... | 600/441 |
| 2005/0238233 | A1 * | 10/2005 | Mulet Parada et al. ....... | 382/199 |
| 2007/0016036 | A1 | 1/2007 | Nishiura | |
| 2007/0078326 | A1 | 4/2007 | Yoshikawa et al. | |
| 2007/0081712 | A1 * | 4/2007 | Huang et al. ................. | 382/128 |
| 2008/0269607 | A1 | 10/2008 | Ishida et al. | |
| 2009/0022379 | A1 * | 1/2009 | Tashiro et al. ............... | 382/131 |
| 2009/0324031 | A1 * | 12/2009 | Gee et al. ..................... | 382/128 |
| 2010/0074475 | A1 * | 3/2010 | Chouno ........................ | 382/107 |
| 2010/0074504 | A1 * | 3/2010 | Bruijns et al. ................ | 382/132 |
| 2010/0246914 | A1 * | 9/2010 | Porikli et al. ................. | 382/131 |
| 2011/0262015 | A1 * | 10/2011 | Ishikawa et al. ............. | 382/128 |
| 2012/0035680 | A1 * | 2/2012 | Napadow ...................... | 607/17 |

(Continued)

FOREIGN PATENT DOCUMENTS

JP 2002-369888 A 12/2002

OTHER PUBLICATIONS

Zhang, Zhengyou. "Iterative Point Matching for Registration of Free-Form Curves." Unité De Recherché Inria-Sophia Antipolis. Mar. 1992. 1-45.

(Continued)

*Primary Examiner* — Phi Hoang
(74) *Attorney, Agent, or Firm* — NSIP Law

(57) ABSTRACT

Provided are a method and apparatus for generating an image of an organ. A medical image is input in real time. The medical image is compared with an image previously obtained using a 3D model, and an image obtained by combining the medical image with the 3D model is output.

21 Claims, 13 Drawing Sheets

(56) References Cited

U.S. PATENT DOCUMENTS

2012/0201428 A1* 8/2012 Joshi et al. .............. 382/107
2012/0289825 A1* 11/2012 Rai et al. .............. 600/425

OTHER PUBLICATIONS

Lowe, David G. "Distinctive Image Features From Scale-Invariant Keypoints." International Journal of Computer Vision 60.2 (2004): 1-28.

Bay, Herbert, Tinne Tuytelaars, and Luc Van Gool. "SURF: Speed Up Robust Features." Computer Vision—ECCV 2006. Springer Berlin Heidelber, 2006. 1-14.

Hwang, Youngkyoo, et al. "Ultrasound Image-Based Respiratory Motion Tracking." SPIE Medical Imaging. International Society for Optics and Photonics, Feb. 2012. 1-6.

* cited by examiner

----- : LOCATION OF MIDRIFF

——— : RESULT OF
        REGRESSION ANALYSIS

✱  : CANDIDATE POINT

----- : BASIC AXIS OF IMAGE

——— : RESULT OF
        REGRESSION ANALYSIS

① : 90° WITH RESPECT TO BASIC AXIS OF IMAGE
② : 0° WITH RESPECT TO BASIC AXIS OF IMAGE
③ : 45° WITH RESPECT TO BASIC AXIS OF IMAGE
④ : RIGHT ANGLE WITH RESPECT TO TANGENT LINE

METHOD AND APPARATUS FOR GENERATING AN IMAGE OF AN ORGAN

CROSS-REFERENCE TO RELATED APPLICATION(S)

This application claims the benefit under 35 USC §119 of Korean Patent Application No. 10-2011-0089388, filed on Sep. 5, 2011, in the Korean Intellectual Property Office, the entire disclosure of which is incorporated herein by reference for all purposes.

BACKGROUND

1. Field

The following description relates to methods and apparatuses for generating an image of a patient using information from medical images.

2. Description of the Related Art

In order to diagnose and treat certain diseases, a patient may undergo a laparotomy so that a state of the patient may be confirmed with the naked eye of a surgeon and an incision and surgery may be performed on a lesion using large surgical instruments.

Recently, high resolution medical images and finely control medical instruments have been developed which enable a surgeon to form a small hole in the skin of a patient and directly insert a catheter or a medical needle into a blood vessel or the body part while directly observing the inside of the body is used. This method is much less invasive. Such a method is often referred to as a "surgical operation using an image" or an "interventional image-based surgical operation." Using this method, a surgeon may determine a location of an organ or a lesion by watching an image observed inside of the patient's body.

In the finely controlled high resolution technology, to successfully perform the surgery a surgeon has to be aware of any change in shape of an organ due to the patient's respiration or motion during surgery. Typically, the surgeon needs to accurately and rapidly determine the patient's respiration or motion based on an image that is input in real time. However, it may be difficult for the human eye to determine a shape of the organ or the lesion in the image as it changes in real time.

SUMMARY

In one general aspect, there is provided A method of generating an image of an organ, the method including generating a three-dimensional (3D) model of an organ of a patient based on a first medical image of the organ, generating a plurality of matched images by matching the 3D model of the organ to a plurality of images indicating a change in a shape of the organ based on movement of the organ, and selecting and outputting a matched image from among the plurality of matched images based on a region of a second medical image of the organ.

The outputting may comprise setting a plurality of candidate regions in the second medical image, selecting a candidate region from among the plurality of candidate regions, and selecting and outputting the matched image from among the plurality of matched images based on the selected candidate region.

The setting of the plurality of candidate regions may comprise receiving at least one location in the second medical image from a user, and setting candidate regions having predetermined shapes and different angles with respect to a basic axis based on the at least one location.

The candidate region may be selected based on a motion distance of the organ between inspiration and expiration of the organ in each of the plurality of candidate regions.

The candidate region may be selected based on a noise level of each of the plurality of candidate regions.

The candidate region may be selected based on a result obtained by combining a noise level of each of the plurality of candidate regions with a motion distance of the organ between inspiration and expiration of the organ in each of the plurality of candidate regions.

The candidate region may be selected based on a result obtained by combining the noise level with the motion distance to which predetermined weights are applied.

The selecting and outputting may comprise determining a phase of respiration of the organ in the second medical image, and selecting and outputting the matched image from among the plurality of matched images based on the determined phase of respiration.

The determining may comprise determining the phase of respiration of the organ based on a gradient of a motion path of the organ between inspiration and expiration of the organ in each of the plurality of candidate regions.

The determining of the phase of respiration may comprise determining that the phase of respiration is an inhalation phase if the gradient of the motion path of the organ is equal to or greater than a first predetermined value, the phase of respiration is an expiration phase if the gradient of the motion path of the organ is equal to or less than a second predetermined value, and the phase of respiration is a transition phase between the inhalation phase and the expiration phase if the gradient of the motion path of the organ is a value between the first predetermined value and the second predetermined value.

In response to determining the phase of respiration is a transition phrase, the determining may further comprise determining whether the transition is from inhalation to expiration or from expiration to inhalation.

The determining of the phase of respiration may comprises determining that in response to a location of the organ in the candidate region being equal to or greater than an upper limit threshold value, the phase of respiration is a phase transited from the inhalation phase to the expiration phase, in response to a location of the organ in the candidate region being equal to or less than a lower limit threshold value, the phase of respiration is a phase transited from the expiration phase to the inhalation phase, and in response to a location of the organ in the candidate region being a value between the upper limit threshold value and the lower limit threshold value, according to a transition phase of a pre-process, and in response to a pre-phase being a phase transited from the inspiration phase to the expiration phase, a current phase is the expiration phase, and in response to a pre-phase being a phase transited from the expiration phase to the inspiration phase, a current phase is the inspiration phase.

The selecting and outputting may comprise extracting landmark points of a real-time medical image, and selecting and outputting the matched image from among the plurality of matched images based on a local descriptor of each of the extracted landmark points.

The outputting may comprise calculating a difference between a location of a midriff in each of the plurality of images and a location of a midriff of a real-time medical image.

The generating of the 3D model may comprise extracting coordinate information of an internal structure and a boundary of the organ in the medical image, designating coordinates of landmark points in the coordinate information, generating a statistical contour model based on the coordinates of the landmark points, and changing the statistical contour model into a model reflecting characteristics in terms of the shape of the organ.

The characteristics in terms of the shape of the organ may further comprise a shape and a location of a lesion.

In another aspect, there is provided a computer-readable recording medium having embodied thereon a program for executing the method described above.

In another aspect, there is provided an apparatus for generating an image of an organ, the apparatus including an organ model generating unit configured to generate a three-dimensional (3D) model of an organ of a patient based on a first medical image indicating the organ, an image matching unit configured to generate matched images by combining the 3D model of the organ with a plurality of images indicating a change in a shape of the organ as the organ moves, and an image searching unit configured to select a matched image from among the matched images based on a region of a second medical image of the organ.

In another aspect, there is provided a method for displaying an image, the method including generating a model of an organ, the model comprising a plurality of images based on a movement of the organ and based on a shape of the organ, receiving an image of an organ of a patient, matching the image of the organ of the patient to an image from among the plurality of images included in the generated model, and displaying the matched image from the generated model as an image corresponding to the image of the organ of the patient.

The model may be generated based on images taken of the organ of the patient during a respiration period which includes at least one inhalation period and at least one expiration period.

The model of the organ may model a respiration cycle of the organ at predetermined intervals during the respiration cycle.

The matching may comprise determining that the organ of the patient is in a period of inhalation, and the matching may further comprise comparing only those images from the model in which the organ is in a period of inhalation to the image of the organ of the patient.

The matching may comprise determining that the organ of the patient is in a period of expiration, and the matching may further comprise comparing only those images from the model in which the organ is in a period of expiration to the image of the organ of the patient.

Other features and aspects may be apparent from the following detailed description, the drawings, and the claims.

Figure 1:
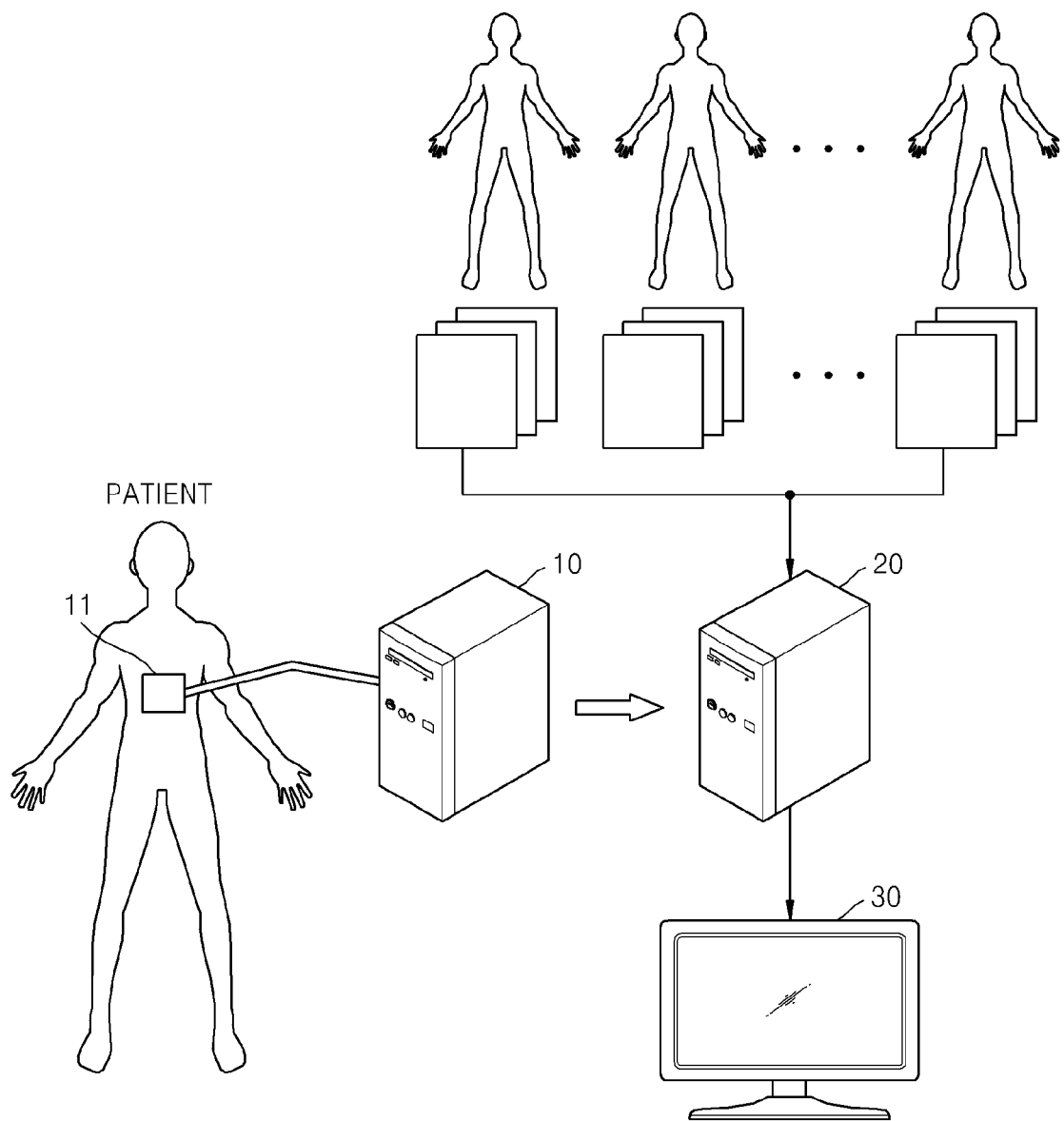
FIG. 1 is a diagram illustrating an example of a system for generating an image of an organ.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a system for generating an image of an organ.

Referring to FIG. 1, the system includes an image detecting device 10, an image matching device 20, and an image displaying device 30. A source signal generated from a probe 11 may be transmitted to a target part of a patient's body to be examined by a medical expert such as a surgeon. The image detecting device 10 may generate image data using a response that is generated by the source signal. The source signal may be any of various signals such as an ultrasound signal or an X-ray signal. An example in which the image detecting device 10 is an ultrasonography machine that captures a three-dimensional (3D) image of the patient's body using ultrasound is provided herein. In the example of FIG. 1, the detecting device 10, the matching device 20, and the display 30 are illustrated as individual components, but one or more may be combined into the same component.

The probe 11 provided in an ultrasound machine may include a piezoelectric transducer. When ultrasound in a frequency range of 2 to 18 MHz is transmitted from the probe 11 of the image detecting device 10 to a target of the patient's body, the ultrasound may be partially reflected from strata between different tissues. For example, the ultrasound may be reflected from portions of the patient's body that have different densities, for example, blood cells of blood plasma or small structures of organs. The reflected ultrasound vibrates the piezoelectric transducer of the probe 11, and the piezoelectric transducer outputs electrical pulses due to the vibration. The electrical pulses may be converted into images.

The image detecting unit 10 may output two-dimensional (2D) images and may also output 3D images. For example, the image detecting device 10 may capture a plurality of cross-sectional images of a target part of the patient's body while changing a location and an orientation of the probe 11. In this example, the image detecting device 10 may accumulate the cross-sectional images and generate 3D volume image data three-dimensionally indicating the target part of the patient's body based on the accumulated images. A method of generating the 3D volume image data by accumulating the cross-sectional images is referred to as multiplanar reconstruction (MPR).

The images obtained by the image detecting device 10 may be images input in real time. Accordingly, it may be difficult for a naked eye to accurately determine an internal structure, a contour of an organ, a lesion, and the like, in the ultrasound images.

In computed tomography (CT) images or magnetic resonance (MR) images, a location of an organ or a location of a lesion may be accurately determined. However, an organ may be deformed or the location of the organ may change due to the patient breathing or moving during a surgical operation. The CT and MR technologies may not accurately reflect these changes in real time. That is, because the CT images are obtained using radiation that requires short time photographing due to the risk of exposing the patient or the surgeon to the radiation for a long time, the CT images may not be output in real time because not enough data may be obtained. Furthermore, because it takes a long time to capture MR images, the MR images may not be output in real time because of the length of time it takes to obtain the data.

Accordingly, there is a demand for a method and apparatus that may capture images in real time and accurately determine an internal structure of an organ, a lesion, and the like. Accordingly, the following description provides a technology that accurately determines a location or deformation of an organ or a lesion by outputting an image obtained by matching a model of the organ or the lesion to images detected in real time. The technology enables a surgeon to view changes in the patient's body in real time.

Figure 2:
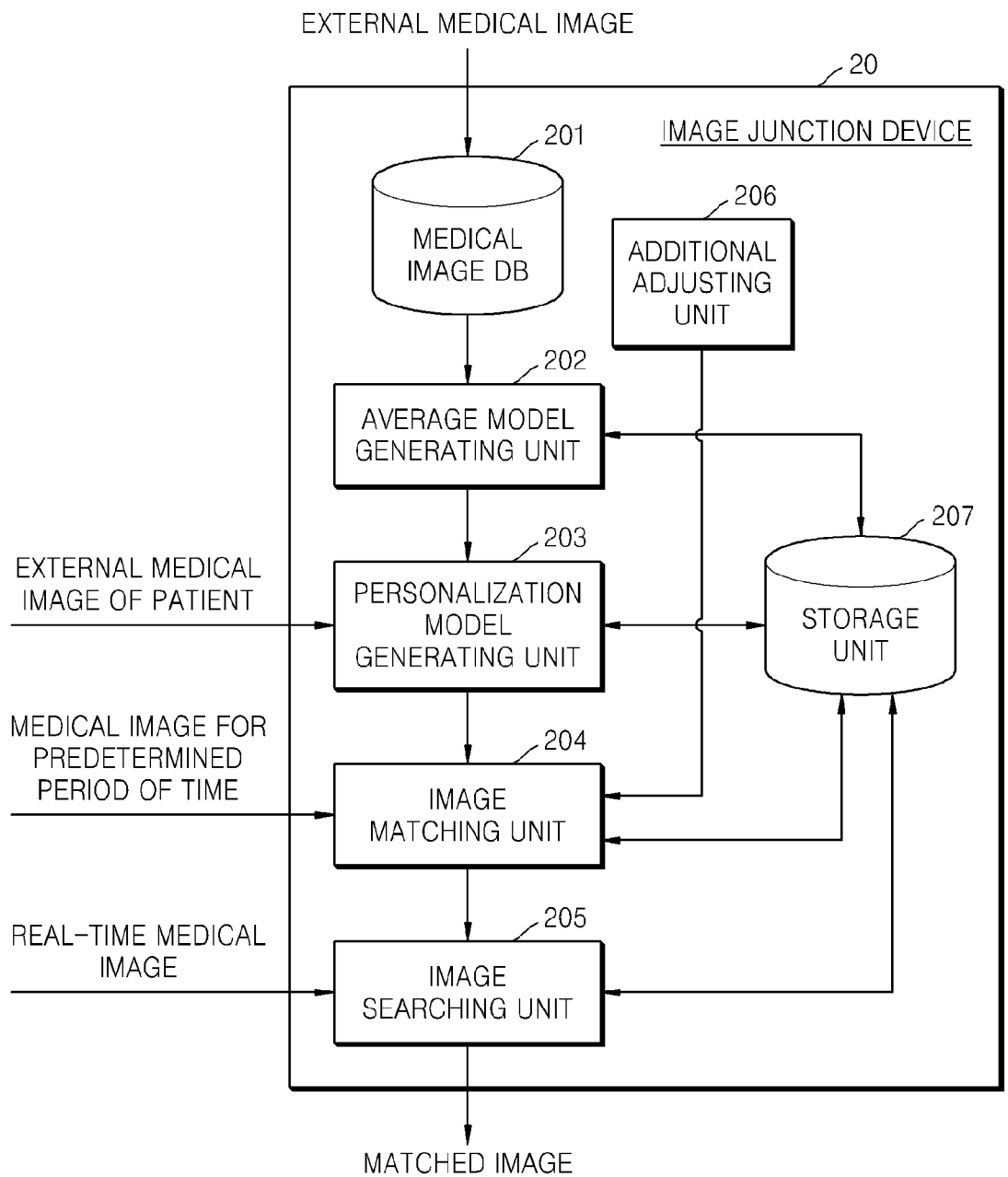
FIG. 2 is a diagram illustrating an example of an image matching device of the system of FIG. 1.

FIG. 2 illustrates an example of the image matching device 20 of the system of FIG. 1. Referring to FIG. 2, the image matching device 20 includes a medical image database (DB) 201, an average model generating unit 202, a personalization model generating unit 203, an image matching unit 204, an image searching unit 205, an additional adjusting unit 206, and a storage unit 207.

The average model generating unit 202 may receive medical images of various patients, process the medical images, and output an average model of an organ. For example, an organ may be traced by generating a personalized model. An operation of generating the average model is a preparatory operation for generating the personalized model. This is because since shapes, sizes, and features of organs may be different between individuals. Accordingly, characteristics of each individual should be reflected in order to accurately perform a surgical operation. In order to obtain an accurate average model, image information of various individuals may be used. Also, in order to reflect a shape of an organ that varies according to respiration, images with various phases of respiration may be obtained.

For example, in order to analyze shapes, sizes, and the like of organs of various individuals, the average model generating unit 202 may receive images (hereinafter, referred to as external medical images) captured to diagnose diseases of patients directly from an imaging device or from a storage medium in which the images are stored. Accordingly, images which allow contours of organs or lesions or features of the insides of the organs to be easily analyzed may be input. For example, CT or MR images may be input as the external medical images.

The external medical image may be stored in the medical image DB 201 and then input to the average model generating unit 202. The medical image DB 201 may store the medical images of the various individuals that may be captured by the imaging device or may be input from the storage medium. For example, the average model generating unit 202 may receive all or some of the external medical images from the medical image DB 201 according to a user's selection.

In an example, the average model generating unit 202 may use a 3D active shape model (ASM) algorithm based on the received external medical images. To use the 3D ASM algorithm, the average model generating unit 202 may extract a shape, a size, and anatomical features of an organ in each of the external medical images by analyzing the external medical images and may generate an average model of the organ. An example of the 3D ASM algorithm is described in detail in the paper "The Use of Active Shape Models For Locating Structure in Medical Images" published in 1994 by T. F. Cootes, A. Hill, C. J. Taylor and J. Haslam, which is incorporated herein in its entirety for all purposes. An average shape of an organ may be obtained using the 3D ASM algorithm, and the average shape of the organ may be modified by adjusting variables.

Figure 3:
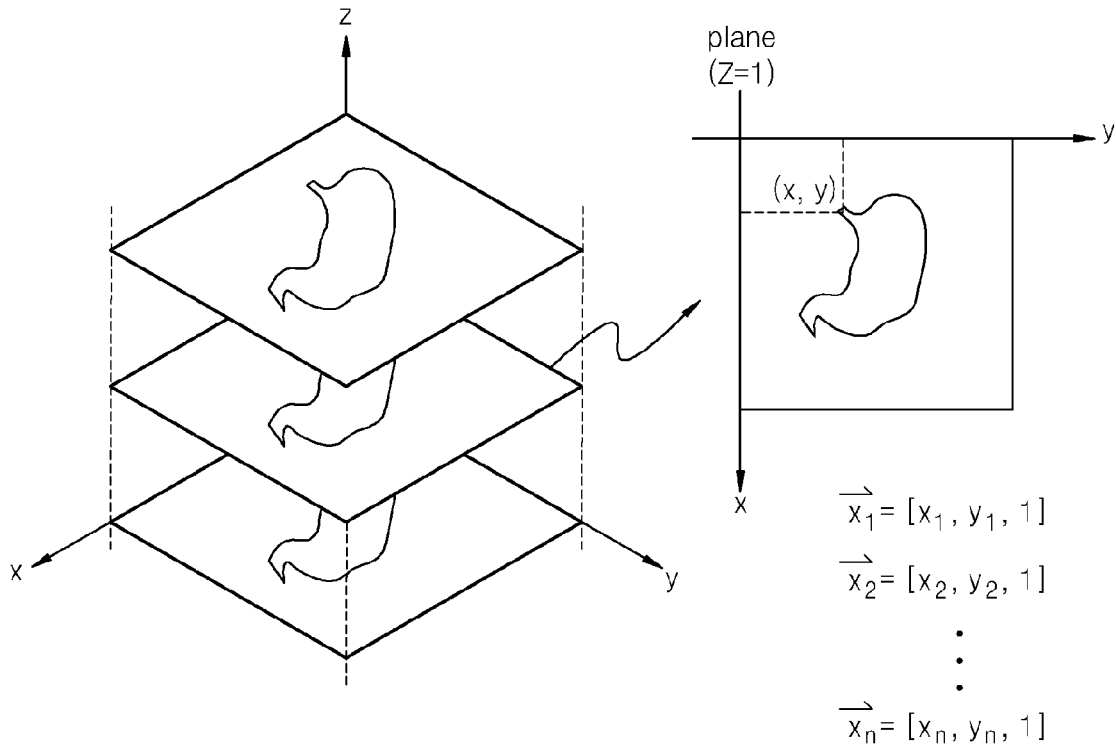
FIG. 3 is a diagram illustrating an example of a process of extracting coordinate information of an internal structure and a boundary of an organ.

FIG. 3 illustrates an example of a process of analyzing external medical images. The analyzing may be performed by the average model generating unit 202. FIG. 3 illustrates an example of extracting coordinate information of an internal structure and a boundary of an organ from external medical images, for example, CT or MR images. The average model generating unit 202 may extract the coordinate information of the internal structure and the boundary of the organ using different methods according to whether the external medical images are 2D images or 3D images. For example, examples of an internal structure of a liver may include a hepatic artery, a hepatic vein, a portal vein, and a hepatic duct, and may broadly include boundary values thereof.

In an example in which 2D images are input as the external medical images, in order to generate a 3D model, the average model generating unit 202 may obtain 3D volume image data that represents a target three-dimensionally by accumulating a plurality of cross-sectional images. An example of obtaining the 3D volume image data is illustrated in the left side of FIG. 3. Before the plurality of cross-sectional images are accumulated, the coordinate information of the internal structure and the boundary of the organ may be extracted from the plurality of cross-sectional images. Next, 3D coordinate information may be obtained by adding coordinate information of an axis along which the plurality of cross-sectional images which are accumulated to the extracted information.

Looking to the right of FIG. 3 is an image that has a z-axis of 1, and a coordinate value of a boundary extracted from the image is always 1. That is, 3D coordinate information of the image illustrated in the right of FIG. 3 is [x,y,1]. Accordingly, coordinate information of cross-sections of images in the left of FIG. 3 is 2D coordinate information [x,y]. In this example, both the coordinate value of the z-axis and the 2D coordinate information [x,y] are extracted to obtain the coordinate information of the images illustrated in the left of FIG. 3. The 3D coordinate information of the images is 3D coordinate information [x,y,z].

In an example in which 3D images are input as the external medical images, cross-sections of the 3D images may be extracted at predetermined intervals and the same process as the case in which the 2D images are input as the external medical images may be performed. In this example, coordinate information of a boundary of an organ in 2D images may be obtained automatically or semi-automatically using an algorithm, or may be input manually by a user.

An example of a method of automatically obtaining coordinate information of the boundary of the organ involves obtaining coordinate information of a part whose brightness is quickly changed in an image and extracting a location with a largest frequency value as a boundary using a discrete time Fourier transformation (DTFT). An example of a method of semi-automatically obtaining coordinate information of the boundary of the organ involves receiving information about a boundary point of an image input by a user and extracting a boundary based on the boundary point in the same manner as that of the method of automatically obtaining coordinate information. Because the boundary of the organ is characterized by being continuous and having a looped curve shape, information about the boundary of the organ may be obtained using the characteristics. The example of the method of semi-automatically obtaining coordinate information does not require searching for an entire image, thus, the method of semi-automatically obtaining coordinate information may obtain a result faster than the method of automatically obtaining coordinate information.

A method of manually obtaining coordinate information involves enabling a user to directly designate coordinates of a boundary while seeing an image. In this case, because intervals at which the coordinates of the boundary are designated may not be continuous, the boundary may be continuously extracted by performing interpolation in discontinuous sections.

If the coordinate information of the organ or a lesion obtained by using any of the above methods is output after a brightness of a voxel corresponding to the coordinates is set to a predetermined value, the user may see a 3D graphic figure of the internal structure and the organ. For example, a brightness of coordinates of a boundary of an organ may be set to a minimum value, that is, a darkest value, an image of the organ may have a dark form in an output image. Accordingly, if a brightness of the organ is set to a middle value between a white color and a black color and a brightness of a lesion is set to a darker color, the organ and the lesion may be easily distinguished from each other with the naked eye. Coordinate information of internal structures and boundaries of a plurality of organs obtained using any of the above methods may be defined as a data set and may be used to perform the 3D ASM algorithm. An example of the 3D ASM algorithm is explained below.

In order to use the 3D ASM algorithm, a plurality of coordinate axes of the internal structures and the boundaries of the plurality of organs are fit to one another. In this example, the term fitting the coordinate axes means fitting centers of gravities of the plurality of organs to one origin and aligning directions of the plurality of organs. Landmark points may be determined in the coordinate information of the internal structures and the boundaries of the plurality of organs. The landmark points are basic points in the 3D ASM algorithm. Examples of determining landmark points are as follows.

1. First, points in which characteristics of a target are distinctly reflected may be determined as landmark points. Examples of the points may include division points of blood vessels of a liver, a boundary between the right atrium and the left atrium in a heart, a boundary between a main vein and, an outer wall of the heart, and the like.

2. Second, highest points or lowest points of a target in a determined coordinate system may be determined as landmark points.

3. Third, points for interpolating between the first determined points and the second determined points may be determined as landmark points along a boundary at predetermined intervals.

The determined landmark points may be represented using coordinates of the x and y-axes in two dimensions or may be represented by using coordinates of the x, y, and z-axes in three dimensions. Accordingly, coordinates of each of the landmark points may be indicated as vectors $x_0, x_1, \ldots x_{n-1}$ three dimensions (where n is a number of the landmark points), and the vectors $x_0, x_1, \ldots x_{n-1}$ may be expressed by Equation 1.

$$x_{i0} = [x_{i0}, y_{i0}, z_{i0}] \qquad (1)$$
$$x_{i1} = [x_{i1}, y_{i1}, z_{i1}]$$
$$\vdots$$
$$x_{in-1} = [x_{in-1}, y_{in-1}, z_{in-1}].$$

In Equation 1, subscript i indicates coordinate information of an internal structure and a boundary of an organ obtained in an $i^{th}$ image. A number of pieces of coordinate information may be increased as desired and the coordinate information may be represented as a single vector to facilitate calculation. Accordingly, a landmark point vector expressing all of the landmark points with one vector may be defined by Equation 2.

$$x_i = [x_{i0}, y_{i0}, z_{i0}, x_{i1}, y_{i1}, z_{i1}, z_{i1}, \ldots, x_{in-1}, y_{in-1}, z_{in-1}]^T \qquad (2),$$

where a size of a vector $x_i$ is 3n×1.

When a number of data sets is N, an average of the landmark points for all of the data sets may be expressed by Equation 3.

$$\bar{x} = \frac{1}{N}\sum_{i=1}^{N} x_i, \qquad (3)$$

where a size of an average vector $\bar{x}$ is 3n×1.

The average model generating unit 202 may obtain the average vector $\bar{x}$ which is an average of the landmark points by calculating Equation 3. If a model is generated based on the average vector $\bar{x}$, the model may become an average organ model. The 3D ASM algorithm may not only generate the average model but also may change a shape of the average model by adjusting a plurality of parameters. Accordingly, the average model generating unit 202 may simply calculate an average model and may also calculate not only the average organ model but also an equation to use the plurality of parameters. An example of an equation for using the plurality of parameters is explained below.

Equation 4 shows a difference between the average of the landmark points and each data. In Equation 4, a subscript i indicates an $i^{th}$ image. Accordingly, Equation 4 indicates a difference between the landmark points of each image and the average of all images.

$$dx_i = x_i - \bar{x} \qquad (4).$$

By using the difference, a covariance matrix S for three variables x, y, and z may be defined by Equation 5. The covariance matrix S is obtained based on a unit eigen-vector for the plurality of parameters which is obtained to be used by the 3D ASM algorithm (details are described in the above cited paper).

$$S = \frac{1}{N}\sum_{i=1}^{N} dx_i dx_i^T, \qquad (5)$$

where a size of the covariance matrix S is 3n×3n.

When the unit eigen-vector of the covariance matrix S is $p_k$, the vector $p_k$ denotes a change in a model generated using the 3D ASM algorithm. For example, when a parameter $b_1$ multiplied by a vector $p_1$ is changed within a range of $-2\sqrt{\lambda_1} \le b_1 < 2\sqrt{\lambda_1}$, a width of the model may be changed, and when a parameter $b_2$ multiplied by a vector $p_2$ is changed within a range of $-2\sqrt{\lambda_2} \le b_2 < 2\sqrt{\lambda_2}$, a height of the model may be changed. The unit eigen-vector $p_k$ whose size is 3b×1 may be obtained by Equation 6 as follows.

$$Sp_k = \lambda_k p_k \qquad (6),$$

where $\lambda_k$ denotes an eigen-value.

A landmark point vector x to which the change in the model is applied may be calculated using the average vector $\bar{x}$ of the landmark points as shown in Equation 7.

$$x = \bar{x} + Pb \qquad (7),$$

where $p=(p_1, p_2, \ldots p_t)$ a size of the unit eigen-vector $p_k$ is 3n×1 and a size of p is 3n×t) denotes first t eigen-vectors, and $b=(b_1, b_2 \ldots b_t)^T$ (a size of the b is t×1) denotes a weight of each eigen-vector.

The average model generating unit 202 may calculate the vector $p=(p_1, p_2, \ldots p_t)$ (a size thereof is 3n×t) using the change in the model by using the 3D ASM algorithm and the average vector $\bar{x}$ (a size thereof is 3n×1) which indicates a shape of an average organ model, by calculating the above equations.

The personalization model generating unit 203 may receive the average organ model $\bar{x}$ and the vector $p=(p_1, p_2, \ldots p_t)$ from the average model generating unit 202, and generate a personalized model by performing, parameter processing of the 3D ASM algorithm. Because shapes and sizes of organs of patients are different, accuracy may be decreased when the average organ model is used. For example, an organ of a patient may have a longer, wider, thicker, or thinner form in comparison to organs of other patients. Also, if an organ of a patient includes a lesion, the personalization model generating unit 203 may include a location of the lesion in a model of the organ in order to accurately determine a shape and a location of the lesion.

In various aspects herein, the personalization model generating unit 203 may receive external medical images of a patient from an imaging device or a storage medium, may analyze a shape, a size, and/or a location of an organ, and if there is a lesion, analyze a location, a size, and a shape of the lesion, an example of which is explained below.

The personalization model generating unit 203 may determine a weight (the vector b) of an eigen-vector of the 3D ASM algorithm of a patient based on the medical images such as CT or MR images in which a shape, size, and location of an organ are more clearly captured. In this example, the personalization model generating unit 203 may receive the external medical images of the patient and obtain coordinate information of an internal structure and a boundary of the organ. For example, the coordinate information may be obtained using the same process as that used by the average model generating unit 202 to analyze the external medical images. In addition, when coordinate information of landmark points are determined by using the same method as that used when the 3D ASM algorithm is used, the vector x (a size thereof is 3n×1) which is a set of personalized landmark points of the patient may be obtained. A personalized model may be an organ model generated based on the vector x. If a characteristic $p_k^T p_k = 1$ of a unit eigen-vector and an inverse function is used in Equation 7, Equation 8 may be obtained. A value of $b=(b_1, b_2, \ldots b_t)^T$ is determined by Equation 8.

$$b = P^T(x - \bar{x}) \qquad (8).$$

The vectors $\bar{x}$ and p determined by the average model generating unit 202 may be stored as an average model of a target organ in a database of the storage unit 207 to be repeatedly used. Also, the external medical images of the patient input to the personalization model generating unit 203 may be additionally used to determine the average model stored in the database when a next patient is medically examined and treated.

When receiving the vectors x, $\bar{x}$, p, and b from the personalization model generating unit 203, the image matching unit 204 may match the vectors to the medical images of the patient during a predetermined period. To perform the matching, a model using the 3D ASM algorithm may be overlapped with a location of an organ in an ultrasound image to output an output image. For example, matching may include a pixel or voxel value corresponding to coordinate information of a model formed by the 3D ASM algorithm that is replaced or overlapped with a predetermined brightness. Once the replacement is carried out, the organ is removed from an original ultrasound image and only a personalized model is output. However, if the overlapping is performed, an image obtained by overlapping the original ultrasound image with the personalized model may be output. If a color of the overlapped image is different from that of another image, the overlapped image may be more easily distinguished with the naked eye. For example, if a personalized model is overlapped with a black-and-white ultrasound image using a blue color, a graphic figure of the overlapped image may be more easily distinguished with the naked eye.

As described herein, medical images may be images captured in real time, for example, ultrasound images. The medical images may be 2D images or 3D images. A predetermined period may be one respiration period. Typically an organ is constantly changing during respiration. For example, if one respiration period of a patient is 5 seconds and an ultrasound image is generated at 20 frames per second, images having 100 frames may be generated.

A method of matching performed by the image matching unit 204 may be divided into two operations. The matching may include an operation of reflecting a change in an organ due to respiration in ultrasound images input for a predetermined period on a 3D organ model. The matching may also include an operation of aligning the changed 3D organ model with a target organ in the ultrasound images by performing scale control, axis rotation, and axis movement.

An example of the operation of reflecting a change in an organ due to respiration on a 3D organ model performed by the image matching unit 204 is as follows. Before matching the ultrasound images to medical images, a value of the vector b, which is a weight of a parameter of the 3D ASM algorithm, may be adjusted by obtaining a change and a location of the organ in each frame of the ultrasound images. The value of the vector b may not be much different from a value of the vector b determined by the average model generating unit 202. This is because the image matching unit 204 reflects only a change due to respiration of the patient and the change in the shape of the organ due to the respiration is smaller than that due to diversity between individuals. Accordingly, the value of the vector b may be determined by performing modification in a predetermined limited range based on the value of the vector b determined by the average model generating unit 202. In addition, a vector b of a previous frame may be reflected to determine a vector b of a next frame. This may be performed because an organ during respiration is continuously changing, and there is no great change during a short period between frames. In response to the value of the vector b being determined, a personalized model reflecting the modification of the organ in each ultrasound image may be generated according to frames by calculating the 3D ASM algorithm.

Figure 4:
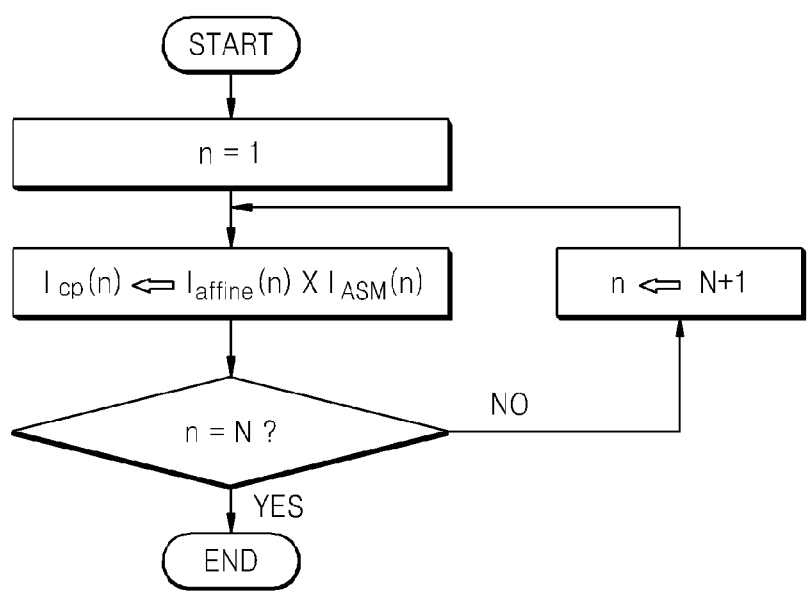
FIG. 4 is a flowchart illustrating an example of a method of fitting a personalized model that reflects a deformation of an organ in each image to a location of an organ in an ultrasound image.

FIG. 4 illustrates an example of a method of fitting a location of an organ in an ultrasound image to a personalized model that reflects a deformation of an organ in each image by performing rotation, scale control, and parallel displacement.

For example, by determining the vector b which is a weight of an eigen-vector in each frame, one-to-one affine matching may be performed in each frame. If a number of frames is N and n is a frame number, one-to-one matching may be performed from 1 to N, that is, from when n=1 to when n=N. An affine transformation function Taffine may be obtained by performing an iterative closest point (ICP) algorithm in each frame using a set of landmark points of a model and a set of landmark points in an ultrasound image, and a 3D organ model image may be transformed using the affine transformation function Taffine. The ICP algorithm is an algorithm for performing rotation, parallel displacement, and scale control on images other than one image in order to align targets in a plurality of images. The ICP algorithm is described in "Iterative point matching for registration of free-form curves and surfaces" by Zhengyou Zhang, which is incorporated herein in its entirety for all purposes.

Figure 5:
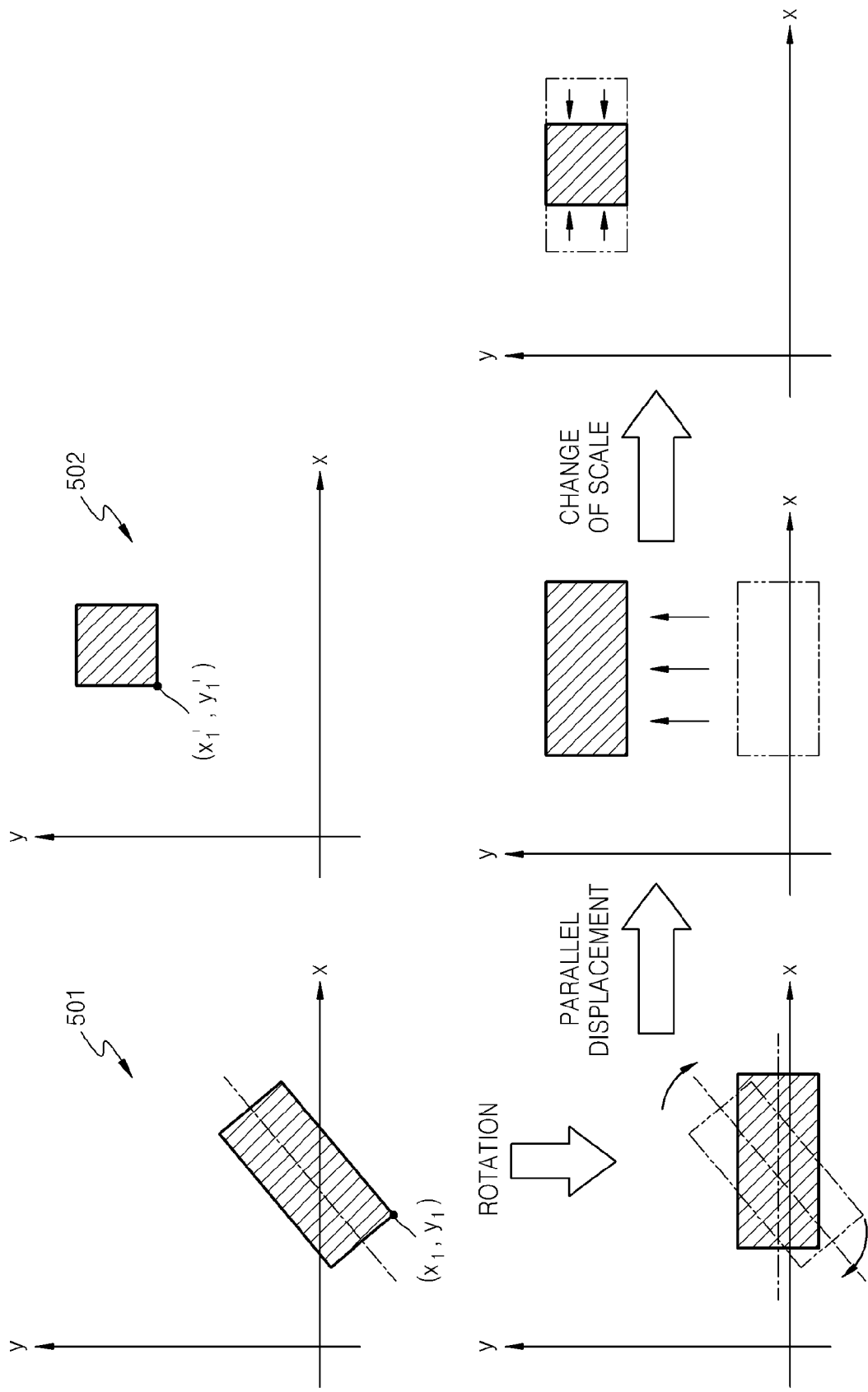
FIG. 5 is a diagram illustrating an example of a process for obtaining an affine transformation function in a two-dimensional (2D) image.

FIG. 5 illustrates an example of a process of obtaining the affine transformation function Taffine in a 2D image. Referring to FIG. 5, graph 501 illustrates a state before transformation and a diagram 502 illustrates a state after the transformation. When the transformation is used, rotation, parallel displacement, and scale control may be performed. Because affine transformation uses one-to-one point correspondence, coefficients of a matrix of the affine transformation function Taffine may be determined by obtaining first coordinates and last coordinates using Equation 9.

$$\begin{bmatrix} x'_1 \\ y'_1 \end{bmatrix} = T_{affine} \begin{bmatrix} x_1 \\ y_1 \\ 1 \end{bmatrix} = \begin{bmatrix} a_1 & b_1 & c_1 \\ a_2 & b_2 & c_2 \end{bmatrix} \begin{bmatrix} x_1 \\ y_1 \\ 1 \end{bmatrix}. \quad (9)$$

Equation 10 applies the affine transformation function Taffine obtained in three or more dimensions instead of two-dimensions to each frame.

$$x_{ICP}(n) = T_{affine}(n) \times x_{ASM}(n) \quad (10),$$

where n is an integer indicating an nth frame and (1≤n≤N). In Equation 10, $x_{ASM}(n)$ denotes a landmark point vector that is obtained by changing the vector b which is a weight in the image matching unit 204. In Equation 10, $x_{ICP}(n)$ includes coordinate information of an internal structure and a boundary of an organ reflecting a modification in each frame. When the coordinate information is matched to an ultrasound image, a graphic figure of the organ may be seen with the naked eye, for example, when a voxel value corresponding to the coordinate information in the ultrasound image is replaced or overlapped with a predetermined brightness.

Figure 6:
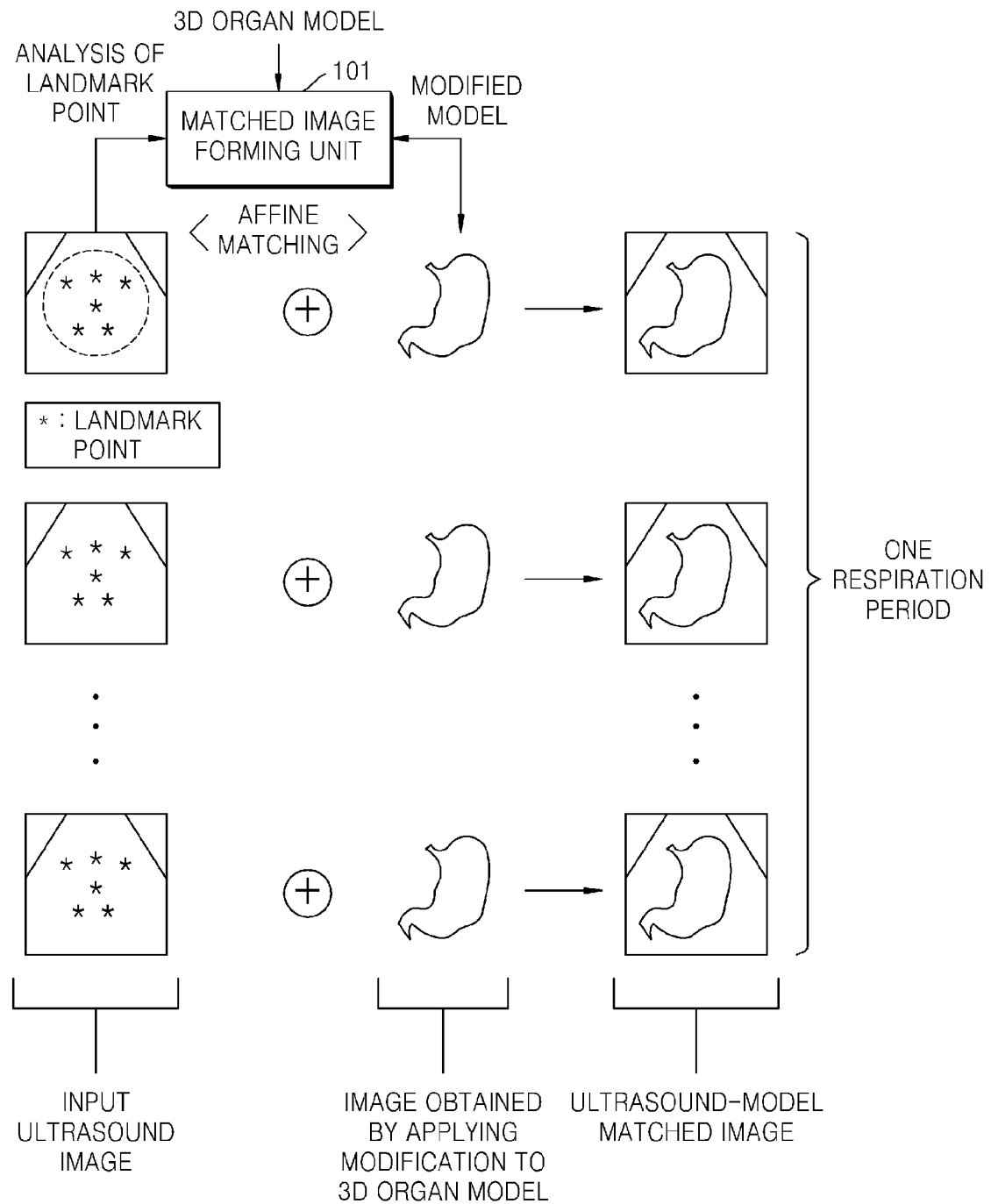
FIG. 6 is a diagram illustrating an example of a process for matching an image.

FIG. 6 illustrates an example of a process of matching an image which may be performed by the image matching unit 204. FIG. 6 illustrates an example of forming a matched image between an organ model and a medical image input for a predetermined period from the image matching unit 204 based on an ultrasound image input for one respiration period. In FIG. 6, the input ultrasound images are disposed at a left edge portion, and marks * in the input ultrasound images indicate landmark points. The input ultrasound images may reflect various types of respiration such as inspiration and expiration.

A shape of a personalized model generated by the personalization model generating unit 203 may be modified according to respiration. However, a modification due to respiration may be less than that due to diversity between individuals. Therefore, in order to accurately reflect a modification due to respiration, it may be faster and easier to adjust parameters determined by the personalization model generating unit 203 than to newly obtain a 3D ASM algorithm. The affine transformation function Taffine may be used through the ICP algorithm using landmark points in an organ of an ultrasound image and landmark points of an organ model reflecting the modification. When affine transformation is performed, a size and a location of a 3D organ model may be modified to be matched to a size and a location of an organ in an ultrasound image. In this example, a modified model may be combined with the ultrasound image by replacing or overlapping a pixel (or a voxel) value of the ultrasound image corresponding to a location of a model with a predetermined value. A matched image may be referred to as an ultrasound-model matched image and may be stored in the storage unit 207. In this case, the matched image may be matched in a one-to-one manner to the medical image input during the predetermined period to the image matching unit 204 and a result thereof may be stored.

The image searching unit 205 may receive medical images of the patient which may be input in real time, and may output a model graphically expressing a shape of an organ in the medical images along with the medical images. In this example, the medical images input in real time to the image searching unit 205 may be the same images as those images input to the image matching unit 204. Accordingly, the image searching unit 205 may compare ultrasound images which are input in real time with medical images input for a predetermined period to the image matching unit 204, may determine a most similar image, may search for an ultrasound-model matched image corresponding to the determined most similar image in the storage unit 207, and may output the ultrasound-model matched image. An example of a process for determining a most similar image is explained below.

A location and a shape of an organ of a patient may change due to respiration while medical images are input in real time. Accordingly, the image searching unit 205 may calculate the change from ultrasound images input in real time, and search for a most suitable ultrasound-model matched image in the storage unit 207 based on the calculated change.

Figure 7:
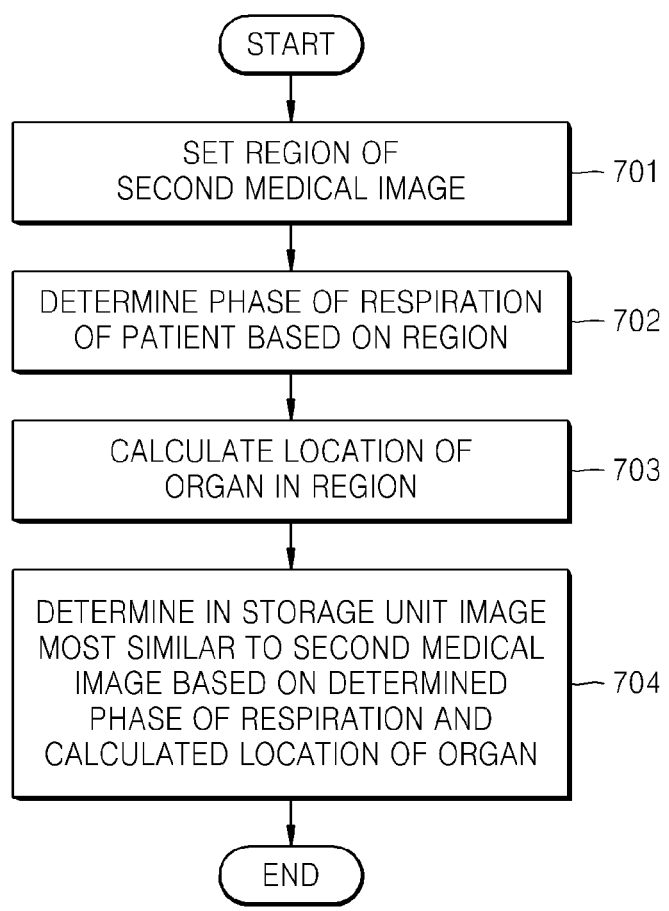
FIG. 7 is a flowchart illustrating an example of a method of searching for an image most similar to ultrasound images input in real time.

FIG. 7 illustrates an example of a method of searching for an image most similar to ultrasound images input in real time in the storage unit 207. Referring to FIG. 7, a method of searching for the similar image may be performed by the image searching unit 205.

In 701, the image searching unit 205 sets a region in ultrasound images input in real time. When ultrasound images input in real time are compared with all images stored in the storage unit 207, the amount of data to be processed when the ultrasound images are compared in a one-to-one manner with all images stored in the storage unit 207 is great. Accordingly, the image searching unit 205 sets a region and performs comparison according to the region, thus reducing the number of comparison. However, an accurate comparison result may not be obtained with only the region. This is because information obtained when the image searching unit 205 analyzes a region is only location information. Accordingly, the image searching unit 205 may use the location information of the organ extracted from the region (hereinafter, referred to as a feature window) to limit a comparison range to some of all images stored in the storage unit 207. Although the image searching unit 205 may perform accurate comparison with only a region, using the fact that a location and a shape of the organ are constantly changed according to a respiration cycle, a comparison range may be limited to an image having a location similar to the location information of the organ from among the images of the storage unit 207. Accordingly, a more accurate image can be obtained in real time.

If the image searching unit 205 selects a feature window, a region that may most effectively show a respiration cycle may be selected. As an example, (1) a region where ultrasonic reflection is high or (2) a clear region in an image may be selected. Accordingly, the image searching unit 205 may set a plurality of candidate regions and may select a region that may most effectively illustrates a respiration cycle from among the plurality of candidate regions. When the image searching unit 205 selects candidate regions, if candidate points are set by medical experts, a plurality of candidate regions including the candidate points may be automatically generated. In this example, when the image searching unit 205 sets candidate regions, a rectangular region having one side longer than another side may be selected in consideration of the fact that respiration is a periodical one-dimensional (1D) motion.

Figure 8:
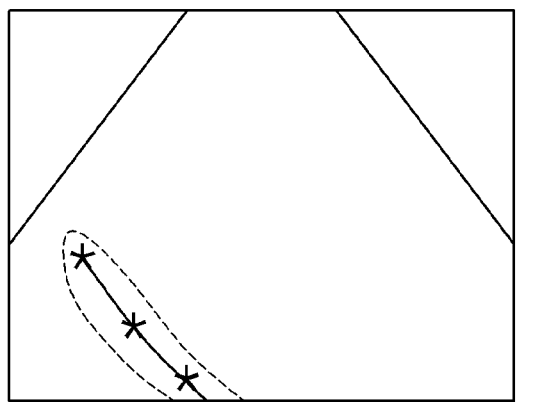
FIG. 8 is a diagram illustrating an example of locations of candidate points selected in an ultrasound image.

FIG. 8 illustrates an example of locations of candidate points selected in an ultrasound image. In FIG. 8, a midriff identifiable by the naked eye is marked by a dashed line. For example, the image searching unit 205 may approximate the midriff marked by the dashed line to one line using regression analysis. In FIG. 8, the approximated line is marked by a solid line and the marks * indicate candidate points selected by a user.

Figure 9:
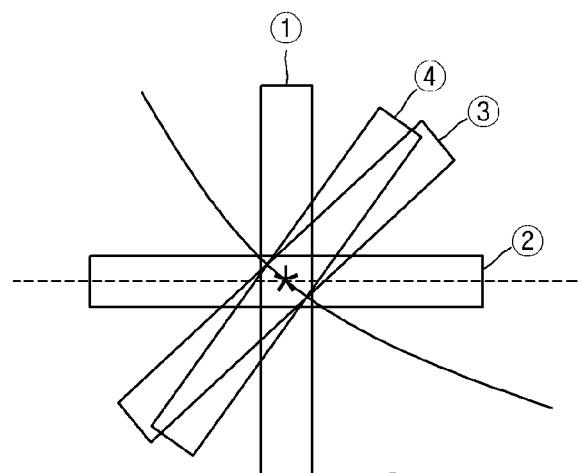
FIG. 9 is a diagram illustrating an example in which the image searching unit automatically generates a candidate region at the candidate points of FIG. 8.

FIG. 9 illustrates an example in which the image searching unit 205 automatically generates a candidate region at the candidate points of FIG. 8. The image searching unit 205 may form the candidate region such that a length of the candidate region in a long axis may include a motion distance of an organ. For example, if the motion distance of the organ during one respiration ranges from 20 to 40 mm, a length of the candidate region may be equal to or greater than 50 to 60 mm.

In this example, a length in a short axis may be determined by analyzing an image. If the length in the short axis is too long because the amount of data to be processed in the candidate region is large, the length in the short axis may be set to a range, for example, from 10 to 20 mm. The image searching unit 205 may set a region to include a landmark point. For example, the image searching unit 205 may set the region such that a center of a rectangular region is located at the landmark point and an angle between a long axis and a basic axis of an ultrasound image is 0°, 45°, 90°, and the like. When a candidate point is designated in a region where features of an organ are linear (as shown in FIG. 9) like a midriff, the image searching unit 205 may approximate the midriff to one line using regression analysis (as marked by a solid line in FIG. 8) and may set a candidate region (④ in FIG. 9) such that a repression line is perpendicular to a long axis. The reason why the candidate region ④ of FIG. 9 is illustrated is that linear motion directions of organs are perpendicular to a linear direction.

Figure 10:
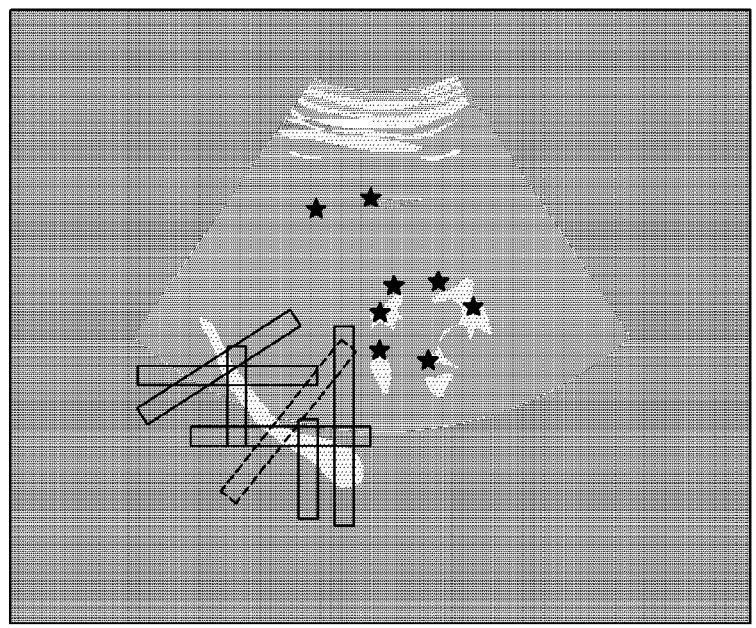
FIG. 10 is a diagram illustrating an example of candidate regions for a feature window in an ultrasound image.

FIG. 10 illustrates an example of candidate regions for a feature window in an ultrasound image. The image searching unit 205 may select a candidate region as a feature window that most effectively illustrates a respiration cycle, from among a plurality of candidate regions. During respiration, a maximum motion of an organ due to the respiration may be large, and the influence of noise in an ultrasound image may be small (hereinafter, expressed with a noise level). Accordingly, in order to effectively show characteristics of respiration from among a plurality of candidate regions, the image searching unit 205 may convert these two characteristics into data, calculate scores of a plurality of candidate regions, and select a candidate region having a highest score as a feature window.

Figure 11:
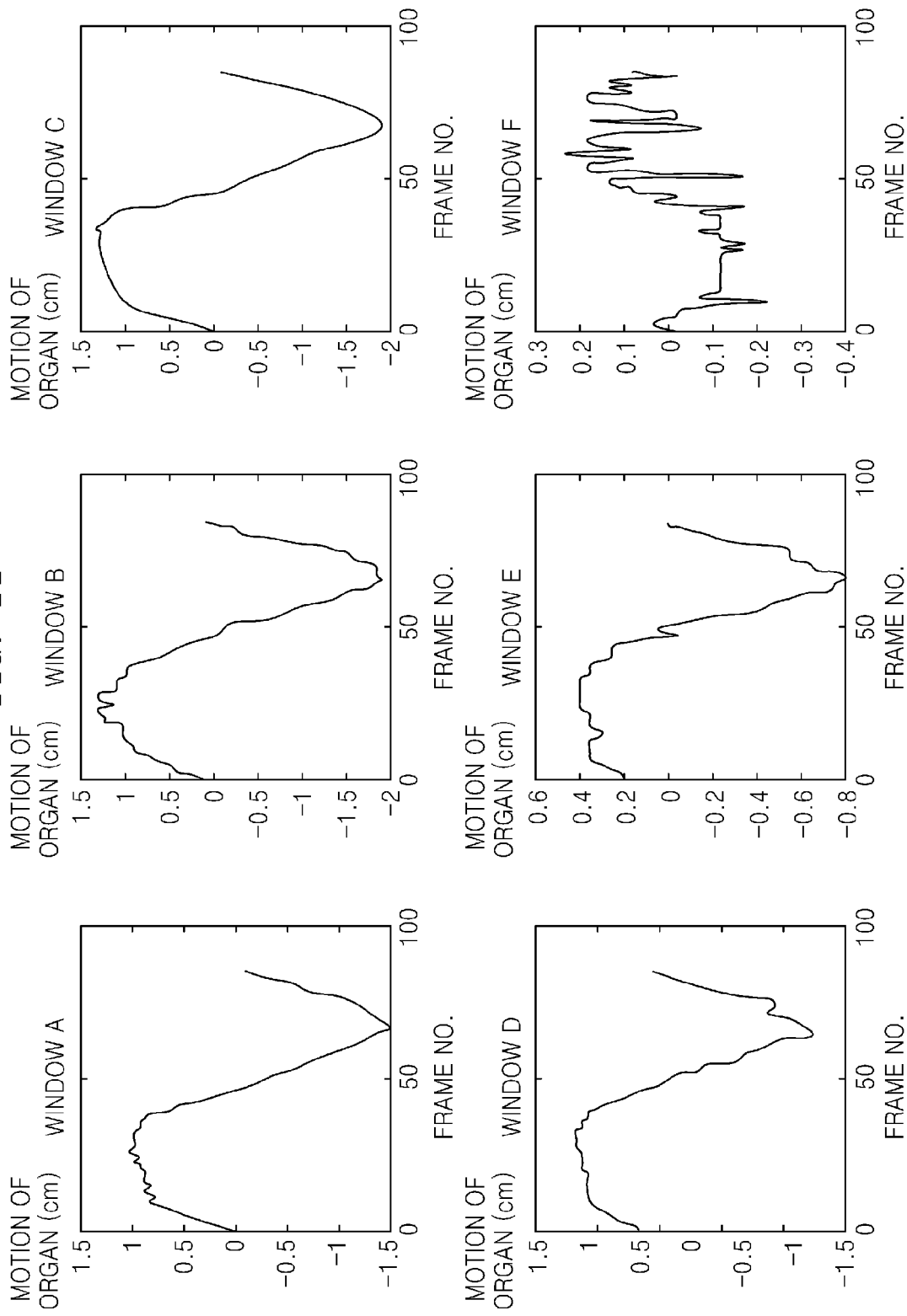
FIG. 11 is a diagram illustrating an example of a motion of an organ in a candidate region of FIG. 10.

FIG. 11 illustrates an example of a motion of an organ in a candidate region shown in FIG. 10. In FIG. 11, an x-axis represents a frame number in ultrasound images input in real time, and a y-axis represents a relative location of a part of the organ in the candidate region (i.e. motion of the organ). The image searching unit 205 may reflect the above two characteristics in a plurality of candidate regions and may determine a candidate region from among the plurality. In the example of FIG. 11, the image searching unit 205 uses six candidate regions.

For example, if the image searching unit 205 considers a noise level, a fifth candidate region Window E and a sixth candidate region Window F may be determined as candidate regions having high noise levels. Accordingly, the image searching unit 205 may exclude the two candidate regions Window E and Window F in selecting a feature window. In this example, the image searching unit 205 compares first through fourth regions Window A through Window D which have noise levels that seem to be similar, however, a motion of the third candidate region Window C may be calculated as higher. Accordingly, the image searching unit 205 may select the third candidate region Window C as a feature window. A process of selecting a feature window performed by the image searching unit 205 is further explained herein with equations.

When the image searching unit 205 obtains a maximum motion of an organ for a respiration period which is a first characteristic, a maximum motion of a part of the organ for one respiration period in each candidate region may be measured and obtained. For example, the image searching unit 205 may obtain the maximum motion in each candidate region by obtaining a motion of a brightest point which is maximally changed in the candidate region during one respiration period. As another example, the image searching unit 205 may obtain the maximum motion using a darkest point.

For example, the image searching unit 205 may determine a maximum motion corresponding to a long axis in a candidate region to determine a 1D motion The image searching unit 205 may measure a motion of a brightest point in a candidate region. In this case, when the image searching unit 205 performs N samplings for one respiration period T, N images may be generated, and n may be an integer set to $0 \leq n < N-1$. The image searching unit 205 may indicate a location of a part of an organ in each candidate region and may express a location of the organ based on a center of a long axis as m(n) in each candidate region. For example, if the location $m(n)=0$, a location of the organ in an $(n+1)^{th}$ image may be at the center of the long axis, if the location $m(n)>0$, the location may be over the center, and if location $m(n)<0$, the location may be under the center. If a point having a highest location is Max{m(n)} and a point having a lowest location is min{m(n)}, the image searching unit 205 may express a maximum motion S1i for one period as shown in Equation 11.

$$S_{1i} = \text{Max}\{m(n)\} - \text{Min}\{m(n)\} \quad (11)$$

where a subscript i denotes an $i^{th}$ candidate region, and i may be an integer satisfying $0 \leq i \leq M-1$ where M is the number of candidate regions.

For example, the image searching unit 205 may obtain a noise level of an ultrasound image in a candidate region which is a second characteristic using a variance of a $2^{nd}$ order differential equation (acceleration) of the location m(n). If there is a great deal of noise in the candidate region, a change in a location may be increased due to the noise. Accordingly, if an acceleration variance is high, it may be assumed that there is lots of noise. In this example, the image searching unit 205 may change a noise level into a numeric value using the $2^{nd}$ order differential equation of the location m(n).

However, because the location m(n) is discontinuous data obtained by sampling a location in a candidate region of an ultrasound image, a process of obtaining a differential equation may be performed as follows.

$$m'(k) = \frac{m(k+1) - m(k)}{(k+1) - k} = m(k+1) - m(k), \quad (12)$$

where k may be an integer satisfying $0 \leq k \leq N-2$.

The $2^{nd}$ order differential equation may be calculated by using Equation 13.

$$\begin{aligned} m''(l) &= m'(l+1) - m'(l) \\ &= \{m(l+2) - m(l+1)\} - \{m(l+1) - m(l)\} \\ &= m(l+2) - 2m(l+1) + m(l), \end{aligned} \quad (13)$$

where l may be an integer satisfying $0 \leq l \leq N-3$.

The variance of the $2^{nd}$ order differential equation may be obtained using Equation 14.

$$\sigma_{m''(l)} = \frac{\sum_{l=0}^{N-3} \{m''(l)\}^2}{(N-3)} - \left(\frac{\sum_{l=0}^{N-3} m''(l)}{(N-3)}\right)^2. \quad (14)$$

When a reciprocal of a variance of an ith candidate region is $S_{2i}$, the reciprocal $S_{2i}$ may be expressed by Equation 15.

$$S_{2i} = \frac{1}{\sigma_{m''(l)}}. \quad (15)$$

As noise increases and the variance increases, the reciprocal $S_{2i}$ may decrease. For example, because a candidate region with less noise is better, the reciprocal $S_{2i}$ should be high.

In order to reflect scores of both the two characteristics, the image searching unit 205 may obtain a final score $W_i$ of the candidate region i by adjusting weights of the two characteristics using a linear coefficient p and Equation 16.

$$W_i = p \frac{S_{1i}}{\text{Max}\{S_{1i}\}} + (1-p) \frac{S_{2i}}{\text{Max}\{S_{2i}\}}. \quad (16)$$

where p is a weight of $S_{1i}$ and $S_{2i}$. The most suitable value for the weight p may be determined through experimentation and may be input to the image searching unit 205. Max{S1i} may be a value having highest $S_{1i}$ and the S1i may be normalized by being divided by Max{S1i}. In this example, Max{S2i} may also be used to perform normalization. As such, Wi which is a score of each candidate region may be calculated and a candidate region having a highest score Wi may be designated as a feature window.

Referring again to FIG. 7, in 702, the image searching unit 205 determines whether a phase of respiration of a patient is inhalation or expiration. The image searching unit 205 determines a phase of respiration because a motion speed of an organ may be different between inspiration and expiration and a deformation may also be different therebetween. When it is determined that ultrasound images input in real time to the image searching unit 205 are of the patient in an expiration phase, the image searching unit 205 may limit a range when searching for an ultrasound-model matched image in the storage unit 207 to only data in an expiration phase. In an inhalation phase, the image searching unit 205 may perform a search in the same manner. By reducing a search range, searching may be performed rapidly, and because the same phases of respiration are compared, an organ may be more precisely traced.

Figure 12:
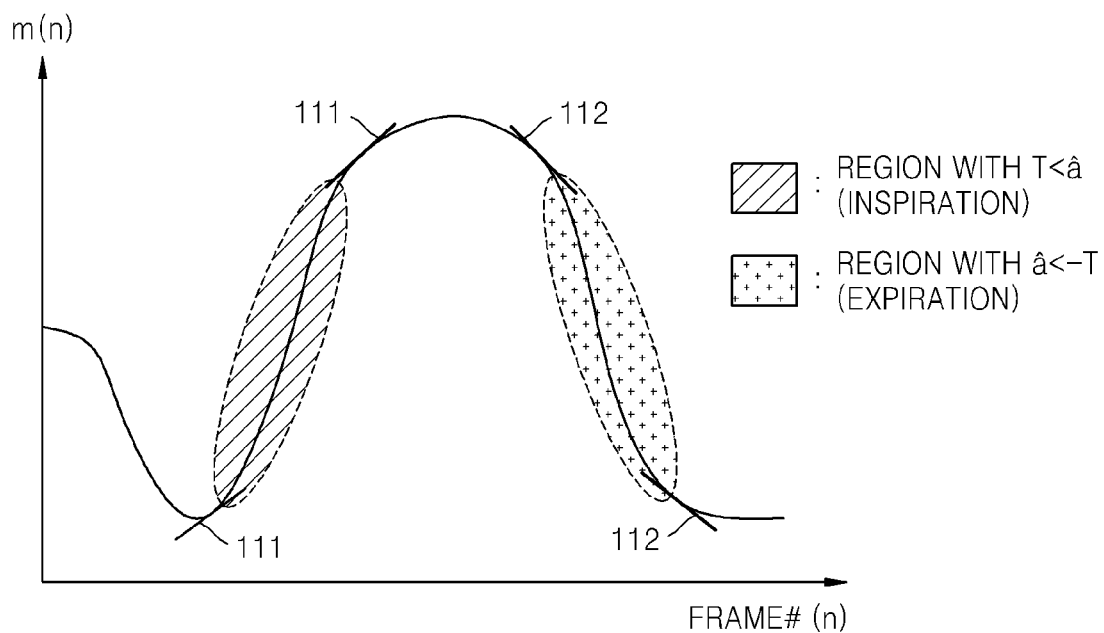
FIG. 12 is a diagram illustrating an example of a motion of an organ in a region selected as a feature window.

A process of determining whether respiration is inhalation or expiration performed by the image searching unit 205 is as follows. FIG. 12 illustrates an example of a motion of an organ in a region selected as a feature window. Like the candidate region in FIG. 11, an x-axis represents a frame number of ultrasound images input in real time and a y-axis represents a relative location of a portion of an organ in the candidate region. An organ moves upwardly when the patient breathes in. In this example, the image searching unit 205 may determine that a portion having a positive gradient is inhalation and a portion having a negative gradient is expiration. For example, the image searching unit 205 may determine that when a gradient â of data is equal to or greater than a predetermined gradient T (>0), respiration is inhalation (â>T) 111, and when the gradient â of the data is equal to or less than the predetermined gradient T, respiration is expiration (â<−T) 112.

In the case of |â|<T, the image searching unit 205 may determine an inhalation-expiration transition section or an expiration-inhalation transition section. For example, if the respiration is inhalation before the transition section, the section may be an inhalation-expiration transition section, and if respiration is expiration before the transition section, the section may be an expiration-inhalation transition section.

Figure 13:
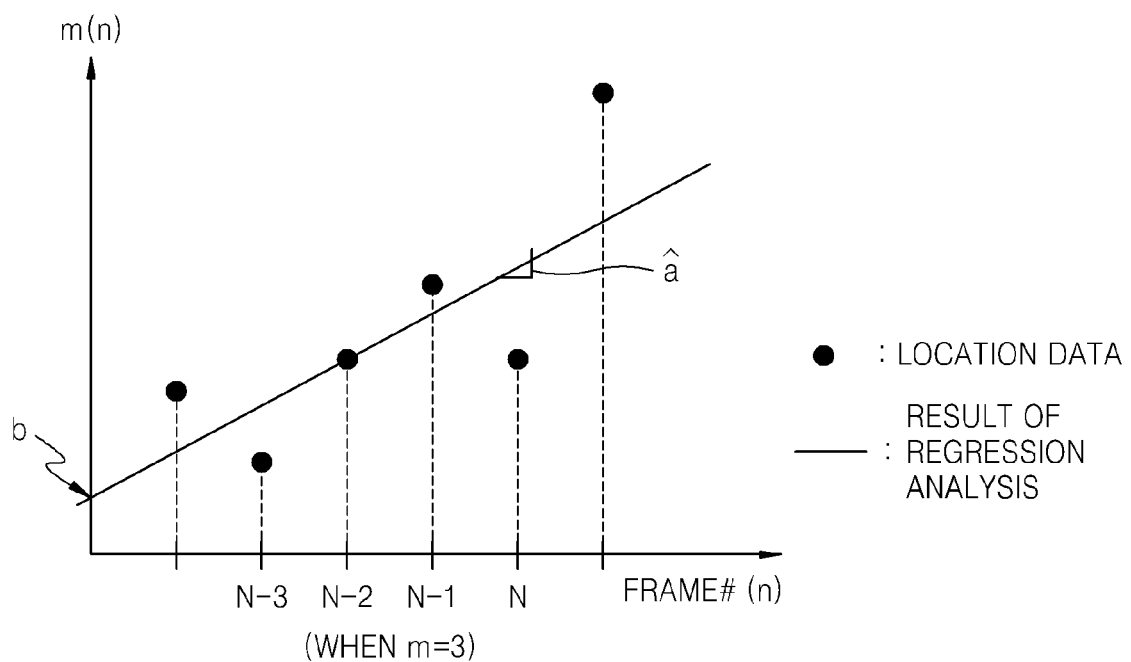
FIG. 13 is a diagram illustrating a portion of FIG. 12.

When the gradient â of the data is obtained, a relative location of the organ in the feature window set in the previous operation may be set to m(n). The relative location m(n) may be discontinuous and noise may be included in the relative location m(n). FIG. 13 is a graph illustrating a portion of FIG. 12. The image searching unit 205 may not directly obtain a gradient of sampled data due to noise in an ultrasound image. Instead the image searching unit 205 may obtain the gradient after removing the noise. In order to remove the noise, the image searching unit 205 may express earlier data of a point to be obtained as a line using regression analysis and measure a gradient of the line. If a gradient to be obtained is N, an arbitrary interval may be set to m and a vector X (a size thereof is (m+1)×1) may be obtained by using Equation 17 when coordinates in an x-axis in FIG. 13 are arranged.

$$\vec{X} = [N-m, N-m+1, \ldots N-1, N]^T \quad (17).$$

Like in Equation 17, a vector F (a size thereof is (m+1)×1) of sampled data in a y-axis may be obtained by using Equation 18.

$$\vec{F} = [m(N-m), m(N-m+1), \ldots m(N-1), m(N)]^T \quad (18).$$

When a gradient of this straight line is â, the image searching unit 205 may use Equation 19 using the above two vectors X and F.

$$\vec{F} = \hat{a}\vec{X} + \vec{B} \quad (19).$$

A vector B is a y-intersect vector and has a size of (m+1)×1, and values of all components of the vector B are constant at b (y-intercept).

$$\vec{B} = [b, b, \ldots b]^T \quad (20).$$

Equation 19 may be expressed by Equation 21.

$$\vec{F} - \hat{a}\vec{X} = \vec{B} \quad (21).$$

When the gradient â is changed into an arbitrary gradient h, the following Inequality 22 may be obtained. This is because when the arbitrary gradient h is equal to the gradient â of the straight line, and the arbitrary gradient h is equal to $|\vec{B}|$, thus the arbitrary gradient h may become a minimum value.

$$|\vec{F} - h\vec{X}| \geq |\vec{B}| \quad (22).$$

An absolute value of $|\vec{A}|$ vector indicates a size of the vector and may be expressed as a root of a sum of squares of components. In $\vec{A} = [a, b, c]^T$, the absolute value $|\vec{A}|$ may be expressed by Equation 23.

$$|\vec{A}| = |[a,b,c]^T| = \sqrt{a^2+b^2+c^2} \quad (23).$$

Accordingly, when the image searching unit 205 obtains the arbitrary gradient h such that $|\vec{F}-h\vec{X}|$ is a minimum value, the arbitrary gradient h may be the gradient â and the gradient â may be expressed by Equation 24.

$$\hat{a} = \underset{h}{\arg\min} |\vec{F} - h\vec{X}|. \quad (24)$$

When the arbitrary gradient h is obtained such that a differential value of Equation 24 is 0 (as in Equation 25), Equation 26 is obtained.

$$\partial/\partial h |\vec{F}-h\vec{X}| = 0 \quad (25).$$

$$\hat{a} = (\vec{X}^T\vec{X})^{-1}\vec{X}^T\vec{F} \quad (26).$$

In 702, using Equations 22 through 26, the image searching unit 205 determines whether respiration is inhalation or expiration by comparing the gradient â of the straight line with a predetermined gradient T using linear regression analysis. In this example, if it is determined that respiration is inhalation, the image searching unit 205 limits a data range to a matched image data region of an inhalation region in an ultrasound-model matched image and if it is determined that respiration is expiration, the image searching unit 205 limits a data range to a data region of an expiration region. Statistically, regression analysis may obtain a linear relationship between a dependent variable and one or more independent variables in continuous variables and may predict the dependent variable when certain independent variables are given.

Figure 14:
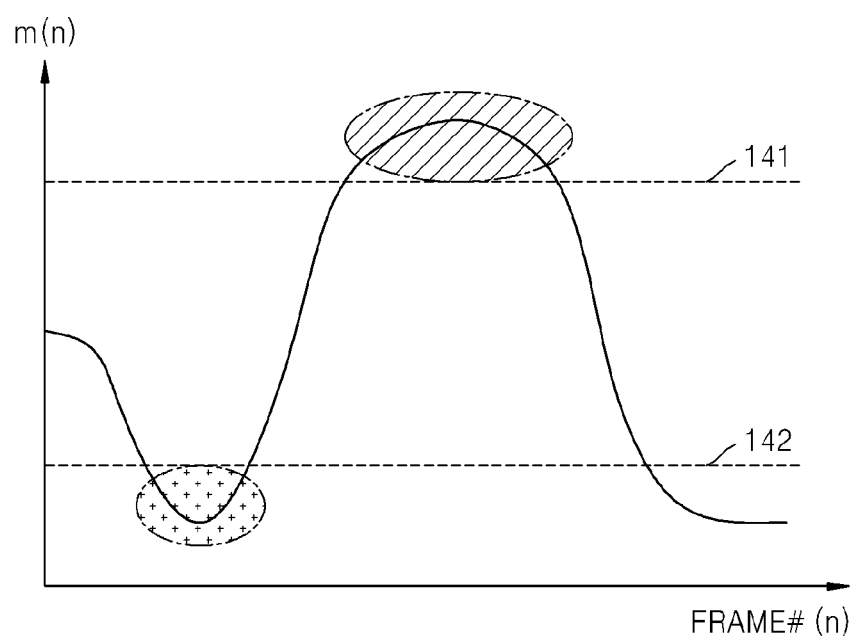
FIG. 14 is a diagram illustrating an example of a process for determining a phase of respiration.

As another example, a phase of respiration may be determined in 702 by the image searching unit 205 using other methods. FIG. 14 illustrates another example of a process of determining a phase of respiration.

Referring to FIG. 14, the image searching unit 205 may determine that when a location m(n) of an organ in a feature window is equal to or higher than a predetermined upper limit threshold value XT 141, an inhalation-expiration transition occurs, and when the location m(n) is equal to or lower than a predetermined lower limit threshold value XB 142, an expiration-inhalation transition occurs. However, because the location m(n) is discontinuous data and there is noise in the location m(n), the image searching unit 205 may correct an error by comparing the location m(n) with ambient data. For example, even if all of data of locations m(1) through m(20) and m(22) through m(30) indicate an expiration-inhalation transition and a location m(21) is equal to or higher than a predetermined value XB, the image searching unit 205 may determine that the location m(21) is in expiration-inhalation transition by considering ambient data. In order to distinguish inhalation from expiration, when a previous process is an expiration-inhalation transition, a current process may be inhalation, and when a previous process is inhalation-expiration, a current process may be expiration.

In 703, the image searching unit 205 calculates a relative location of the organ in the feature window. The image searching unit 205 may limit a search range to images of locations that are close to the location calculated in the ultrasound-model matched image stored in the storage unit 207, to reduce a search range. For example, if the image searching unit 205 determines a location of the organ in a feature window in a real-time medical image in an expiration section, an ultrasound-model matched image positioned at the same location as the location of the organ may be determined in an expiration data region of the storage unit 207 and a search range may be limited to a certain number of frames before and after frames of the determined image.

In 704, the image searching unit 205 searches for an image most similar to a real-time ultrasound image in a limited ultrasound-model matched image data region stored in the storage unit 207. For example, the image searching unit 205 may precisely search for a most similar image using a feature detection algorithm.

Figure 15:
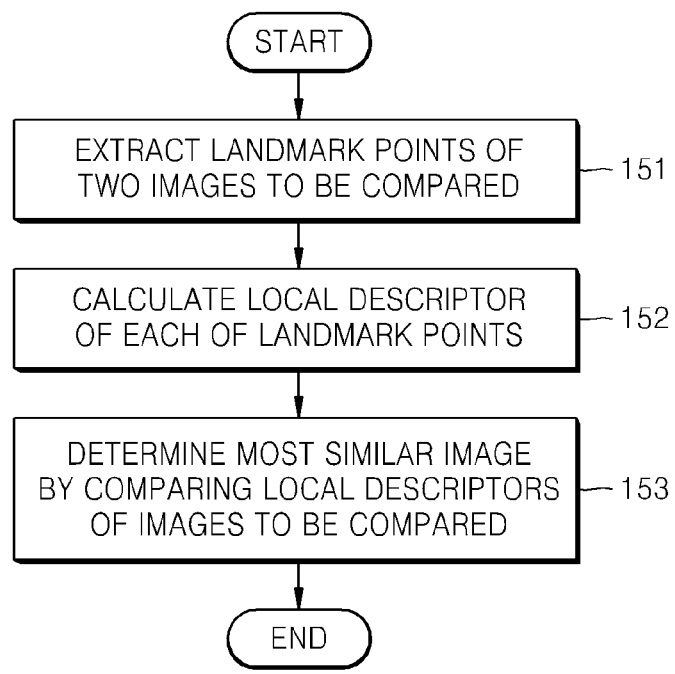
FIG. 15 is a flowchart illustrating an example of a method of searching for a most similar image using a feature detection algorithm.

FIG. 15 illustrates an example of a process of searching for a most similar image using a feature detection algorithm in operation 704. Referring to FIG. 15, in 151, the image searching unit 205 extracts landmark points of two images which are to be compared. For example, the two images may be a real-time ultrasound image and an ultrasound-model matched image stored in the storage unit 207. The landmark points may be points that effectively show features of an entire image or a target in an image, and may be plural or singular. The image searching unit 205 may set the landmark points manually or automatically as in a method designated to use the 3D ASM algorithm. To automatically set the landmark points, the image searching unit 205 may use an algorithm, for example, a Harris corner algorithm. An example of the Harris corner algorithm is described in detail in the paper "A combined corner and edge detector" published in 1988 by C. Harris and M. Stephens, which is incorporated herein in its entirety for all purposes. Alternatively, if the image searching unit 205 extracts an edge portion in an image, the edge portion may act as the landmark points. In this example, an edge portion may indicate a contour of an organ and a shape of a lesion in a medical image, and thus may have important features. Accordingly, the image searching unit 205 may extract a boundary using Difference of Gaussian (DoG) and use the boundary as the landmark points.

In 152, the image searching unit 205 may use a local descriptor of each of the extracted landmark points. The local descriptor is a unit that expresses features of an image around a point as data. The image searching unit 205 may compare local descriptors of landmark points, and may determine which image is similar.

In 153, the image searching unit 205 generates a local descriptor of each of the landmark points of the image to be compared, compares the local descriptors, and precisely searches for a most similar image. For example, the image searching unit 205 may obtain the local descriptor using a scale-invariant feature transformation (SIFT) algorithm or a speeded-up robust feature (SURF) algorithm. The SIFT algorithm is described in detail in the paper "Distinctive Image Features from Scale-Invariant Keypoints" published in 2004 by David G. Lowe and the SURF algorithm is described in detail in the paper "SURF: Speeded Up Robust Features" published in 2006 by Herbert Bay, Tinne Tuytelaars, and Luc Van Gool, both of which are incorporated herein in their entirety for all purposes.

The image searching unit 205 may receive a real-time ultrasound image and determine an image that is most similar to the real-time ultrasound image using another method. For example, the image searching unit 205 may measure a location of a portion where a shape of an organ is relatively clear in the real-time ultrasound image, measure a portion positioned at the same location in an ultrasound-model matched image to be compared, and determine an image having a lowest distance difference between the measured two locations as a most similar image. For example, a midriff may be a portion where a shape is relatively clear in a real-time ultrasound image around a liver.

When a user requests an image output from the image searching unit 205 to be adjusted, the additional adjusting unit 206 may adjust a final output result by adjusting parameters of the 3D ASM algorithm and the affine transformation function Taffine.

Figure 16:
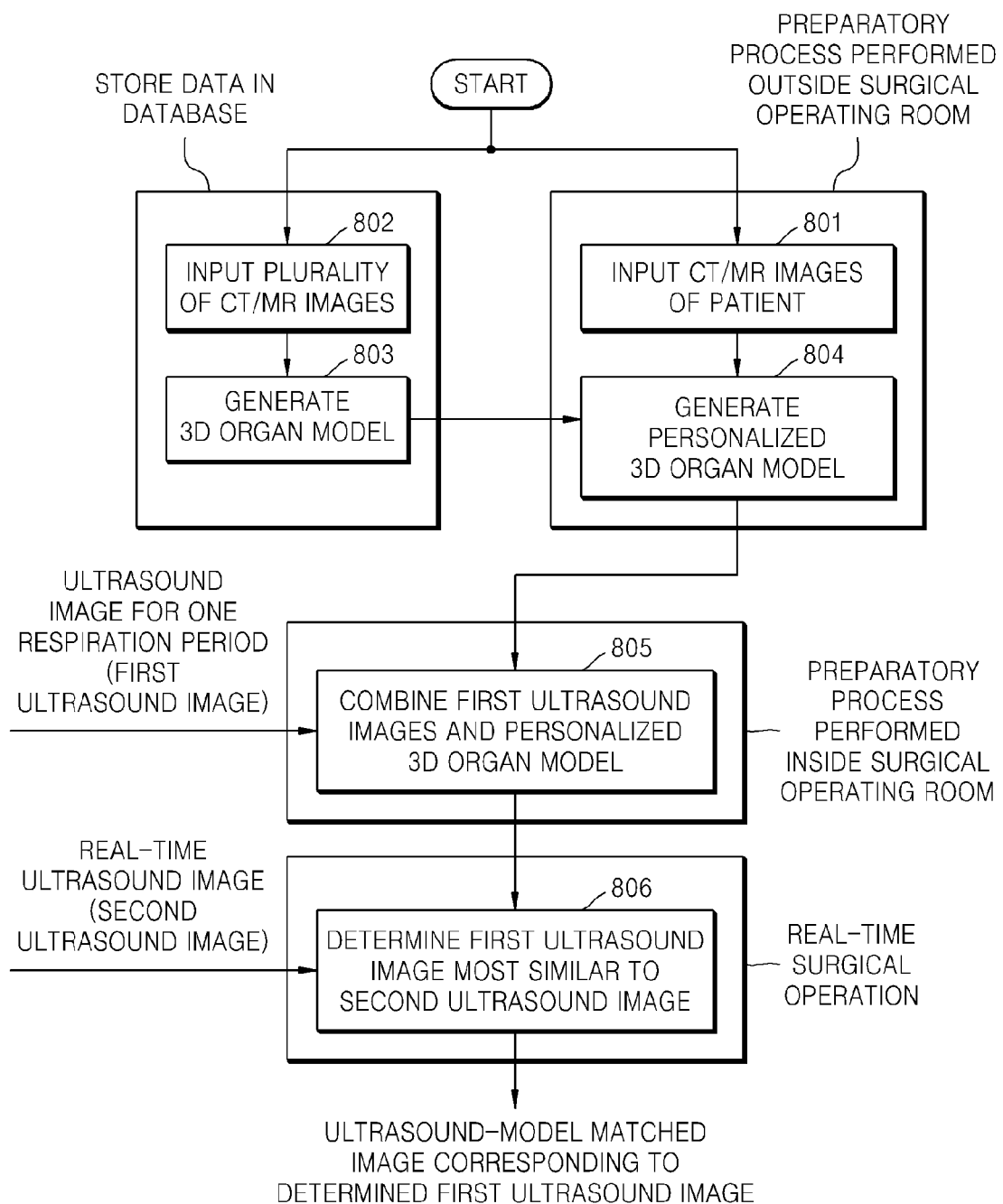
FIG. 16 is a flowchart illustrating an example of a method of tracing a lesion and a dynamic organ based on a three-dimensional (3D) organ model.

FIG. 16 illustrates an example of a process of tracing a dynamic organ and a lesion based on a 3D organ model. Operations 802 and 803 may be performed and results may be stored in a database. In 802, the average model generating unit 202 receives CT or MR images about various respiration cycles of various individuals. In 803, the average model generating unit 202 generates a 3D organ model based on the received CT or MR images by using a 3D ASM algorithm as described above.

In 801, the personalization model generating unit 203 receives a CT or MR image of a patient. In 804, the 3D organ model generated in operation 803 is modified based on the CT or MR image input to the personalization model generating unit 203. A process of generating the personalized 3D organ model performed by the personalization model generating unit 203 may be performed as a preparatory process outside a surgical operating room. In 805, the image matching unit 204 receives ultrasound images (hereinafter, referred to as first ultrasound images) captured for one respiration period of the patient, and matches the first ultrasound images to the personalized organ model to obtain an ultrasound-model matched image. For example, the ultrasound-model matched image may be stored in a temporary memory or a storage medium such as the storage unit 207.

In this example, 805 may be performed by the image matching unit 204 as a preparatory process inside the surgical operating room. Also, the locations of the patient and a probe may be fixed in operations 805 and 806. In 806, when an ultrasound image of the patient is input in real time as a real-time process inside the surgical operating room to the image searching unit 205, the image searching unit 205 determines an image which is most similar to the ultrasound image from among the first ultrasound images and outputs an ultrasound-model matched image corresponding to the determined first ultrasound image.

According to various aspects, an image may be obtained by combining a medical image output in real time with a graphic model of an organ, and a location of the organ may be accurately and rapidly traced during an interventional surgical operation.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims

What is claimed is:

1. A method of generating an image of an organ, the method comprising:
    generating a three-dimensional (3D) model of an organ of a patient based on a first medical image of the organ;
    generating a plurality of matched images by matching the 3D model of the organ to a plurality of images indicating a change in a shape of the organ based on movement of the organ; and
    selecting and outputting a matched image from among the plurality of matched images based on a region of a second medical image of the organ, wherein the selecting and outputting comprises
setting a plurality of candidate regions in the second medical image;
selecting a candidate region from among the plurality of candidate regions, wherein the candidate region is selected based on a result obtained by combining a noise level of each of the plurality of candidate regions with a motion distance of the organ between inspiration and expiration of the organ in each of the plurality of candidate regions; and
selecting and outputting the matched image from among the plurality of matched images based on the selected candidate region.

2. The method of claim 1, wherein the setting of the plurality of candidate regions comprises:
receiving at least one location in the second medical image from a user; and
setting candidate regions having predetermined shapes and different angles with respect to a basic axis based on the at least one location.

3. The method of claim 1, wherein the candidate region is selected based on a motion distance of the organ between inspiration and expiration of the organ in each of the plurality of candidate regions.

4. The method of claim 1, wherein the candidate region is selected based on a noise level of each of the plurality of candidate regions.

5. The method of claim 1, wherein the candidate region is selected based on a result obtained by combining the noise level with the motion distance to which predetermined weights are applied.

6. The method of claim 1, wherein the selecting and outputting comprises:
determining a phase of respiration of the organ in the second medical image; and
selecting and outputting the matched image from among the plurality of matched images based on the determined phase of respiration.

7. The method of claim 6, wherein the determining comprises determining the phase of respiration of the organ based on a gradient of a motion path of the organ between inspiration and expiration of the organ in each of the plurality of candidate regions.

8. The method of claim 7, wherein the determining of the phase of respiration comprises determining that the phase of respiration is an inhalation phase if the gradient of the motion path of the organ is equal to or greater than a first predetermined value, the phase of respiration is an expiration phase if the gradient of the motion path of the organ is equal to or less than a second predetermined value, and the phase of respiration is a transition phase between the inhalation phase and the expiration phase if the gradient of the motion path of the organ is a value between the first predetermined value and the second predetermined value.

9. The method of claim 8, wherein, in response to determining the phase of respiration is a transition phrase, the determining further comprises determining whether the transition is from inhalation to expiration or from expiration to inhalation.

10. The method of claim 6, wherein the determining of the phase of respiration comprises determining that
in response to a location of the organ in the candidate region being equal to or greater than an upper limit threshold value, the phase of respiration is a phase transited from the inhalation phase to the expiration phase;
in response to a location of the organ in the candidate region being equal to or less than a lower limit threshold value, the phase of respiration is a phase transited from the expiration phase to the inhalation phase; and
in response to a location of the organ in the candidate region being a value between the upper limit threshold value and the lower limit threshold value, according to a transition phase of a pre-process, and
in response to a pre-phase being a phase transited from the inspiration phase to the expiration phase, a current phase is the expiration phase, and
in response to a pre-phase being a phase transited from the expiration phase to the inspiration phase, a current phase is the inspiration phase.

11. The method of claim 1, wherein the outputting comprises calculating a difference between a location of a midriff in each of the plurality of images and a location of a midriff of a real-time medical image.

12. The method of claim 1, wherein the generating of the 3D model comprises:
extracting coordinate information of an internal structure and a boundary of the organ in the medical image;
designating coordinates of landmark points in the coordinate information;
generating a statistical contour model based on the coordinates of the landmark points; and
changing the statistical contour model into a model reflecting characteristics in terms of the shape of the organ.

13. The method of claim 12, wherein the characteristics in terms of the shape of the organ further comprise a shape and a location of a lesion.

14. The method of claim 1, wherein the selecting and outputting comprises:
extracting landmark points of a real-time medical image; and
selecting and outputting the matched image from among the plurality of matched images based on a local descriptor of each of the extracted landmark points.

15. A non-transitory computer-readable recording medium having embodied thereon a program for executing the method of claim 1.

16. An apparatus for generating an image of an organ, the apparatus comprising:
an organ model generating unit configured to generate a three-dimensional (3D) model of an organ of a patient based on a first medical image indicating the organ;
an image matching unit configured to generate matched images by combining the 3D model of the organ with a plurality of images indicating a change in a shape of the organ as the organ moves; and
an image searching unit configured to select a matched image from among the matched images based on a region of a second medical image of the organ
wherein the selecting and comprises
setting a plurality of candidate regions in the second medical image;
selecting a candidate region from among the plurality of candidate regions, wherein the candidate region is selected based on a result obtained by combining a noise level of each of the plurality of candidate regions with a motion distance of the organ between inspiration and expiration of the organ in each of the plurality of candidate regions; and
selecting and outputting the matched image from among the plurality of matched images based on the selected candidate region.

17. A method for displaying an image, the method comprising:

generating a model of an organ, the model comprising a plurality of images based on a movement of the organ and based on a shape of the organ;

receiving an image of an organ of a patient;

matching the image of the organ of the patient to an image from among the plurality of images included in the generated model; and displaying the matched image from the generated model as an image corresponding to the image of the organ of the patient wherein the matching comprises setting a plurality of candidate regions in the second medical image;

selecting a candidate region from among the plurality of candidate regions, wherein the candidate region is selected based on a result obtained by combining a noise level of each of the plurality of candidate regions with a motion distance of the organ between inspiration and expiration of the organ in each of the plurality of candidate regions; and selecting and outputting the matched image from among the plurality of matched images based on the selected candidate region.

18. The method of claim 17, wherein the model is generated based on images taken of the organ of the patient during a respiration period which includes at least one inhalation period and at least one expiration period.

19. The method of claim 17, wherein the model of the organ models a respiration cycle of the organ at predetermined intervals during the respiration cycle.

20. The method of claim 17, wherein the matching comprises determining that the organ of the patient is in a period of inhalation, and the matching further comprises comparing only those images from the model in which the organ is in a period of inhalation to the image of the organ of the patient.

21. The method of claim 17, wherein the matching comprises determining that the organ of the patient is in a period of expiration, and the matching further comprises comparing only those images from the model in which the organ is in a period of expiration to the image of the organ of the patient.

\* \* \* \* \*